(12) United States Patent
Shimizu et al.

(10) Patent No.: US 7,920,147 B2
(45) Date of Patent: Apr. 5, 2011

(54) IMAGE PROCESSING APPARATUS, IMAGE PROCESSING PROCESS, AND RECORDING MEDIUM

(75) Inventors: Hideyuki Shimizu, Kanagawa (JP); Akihiro Takashima, Kanagawa (JP); Mitsuko Honma, Kanagawa (JP)

(73) Assignee: Sony Corporation, Tokyo (JP)

( * ) Notice: Subject to any disclaimer, the term of this patent is extended or adjusted under 35 U.S.C. 154(b) by 507 days.

(21) Appl. No.: 11/363,080

(22) Filed: Feb. 28, 2006

(65) Prior Publication Data

US 2006/0209082 A1    Sep. 21, 2006

(30) Foreign Application Priority Data

Mar. 17, 2005    (JP) ................. 2005-076500

(51) Int. Cl.
- *G09G 5/02* (2006.01)
- *G06T 15/50* (2006.01)
- *G06T 15/60* (2006.01)
- *G06K 9/40* (2006.01)

(52) U.S. Cl. .............. 345/604; 345/426; 382/274

(58) Field of Classification Search .......... 345/604, 345/426; 382/274
See application file for complete search history.

(56) References Cited

U.S. PATENT DOCUMENTS

| | | | |
|---|---|---|---|
| 5,577,203 A * | 11/1996 | Reinert et al. ............ | 345/558 |
| 5,822,465 A * | 10/1998 | Normile et al. ........... | 382/253 |
| 5,990,982 A * | 11/1999 | Gove et al. ............... | 348/750 |
| 6,088,130 A * | 7/2000 | Matsukubo ............... | 358/447 |
| 6,281,938 B1 * | 8/2001 | Rogers .................... | 348/555 |
| 6,357,047 B1 * | 3/2002 | Kurtze et al. ............. | 725/151 |
| 6,400,843 B1 * | 6/2002 | Shu et al. ................. | 382/167 |
| 6,487,308 B1 * | 11/2002 | Ulichney et al. .......... | 382/162 |
| 6,707,459 B1 * | 3/2004 | Graves et al. ............ | 345/604 |
| 7,139,022 B1 * | 11/2006 | Raffy ...................... | 348/273 |
| 2002/0037103 A1 * | 3/2002 | Hong et al. ............... | 382/173 |
| 2004/0061707 A1 * | 4/2004 | Yoshida ................... | 345/690 |
| 2004/0109086 A1 * | 6/2004 | Mathew et al. ........... | 348/453 |
| 2005/0032574 A1 * | 2/2005 | Ohta ....................... | 463/31 |
| 2005/0062755 A1 * | 3/2005 | Van Dyke et al. ........ | 345/603 |
| 2005/0129130 A1 * | 6/2005 | Shen et al. ............... | 375/240.24 |
| 2005/0162436 A1 * | 7/2005 | Van Hook et al. ........ | 345/546 |
| 2005/0219252 A1 * | 10/2005 | Buxton et al. ............ | 345/542 |

FOREIGN PATENT DOCUMENTS

JP    2001-100730    4/2001

* cited by examiner

*Primary Examiner* — Xiao M Wu
*Assistant Examiner* — David T Welch
(74) *Attorney, Agent, or Firm* — Oblon, Spivak, McClelland, Maier & Neustadt, L.L.P.

(57) ABSTRACT

The present invention relates to an image processing apparatus that performs predetermined conversion processing with keeping the color of an original image and eliminating processing time necessary for color space conversion, when applying special effects on video signals. The image processing apparatus includes a video signal input section for receiving a video signal having a value represented in a first color space, a signal converting section for performing predetermined conversion processing on a signal having a value represented in a second color space that is different from the first color space, and a signal interface section for supplying the signal converting section with the video signal, received by the video signal input section, that has a value represented in the first color space as a substitute for the signal having a value represented in the second color space.

9 Claims, 2 Drawing Sheets

IMAGE PROCESSING APPARATUS, IMAGE PROCESSING PROCESS, AND RECORDING MEDIUM

CROSS REFERENCES TO RELATED APPLICATIONS

The present invention contains subject matter related to Japanese Patent Application JP 2005-076500 filed in the Japanese Patent Office on Mar. 17, 2005, the entire contents of which are incorporated herein by reference.

BACKGROUND OF THE INVENTION

1. Field of the Invention

The present invention relates to image processing apparatuses and image processing processes for performing predetermined signal processing on video signals, and to recording media having a program recorded thereon that enables a computer to execute the process. More particularly, the present invention relates to an image processing apparatus and an image processing process that employ texture mapping techniques in computer graphics when applying three-dimensional special image effects to video signals, and to a recording medium having a program recorded thereon that enables a computer to execute the process.

2. Description of the Related Art

In the field of computer graphics, three-dimensional (3D) special effects, such as translation, rotation, and deformation, can be easily applied to the target graphics using texture mapping techniques.

Image processing apparatuses that apply such special effects employ the RGB color space. This is because, when the RGB color space is employed, the calculation for luminance adjustment, such as shading processing, becomes easier, since the color "black" is represented in the RGB color space as (R, G, B)=(0, 0, 0).

Japanese Unexamined Patent Application Publications No. 7-212695, No. 11-18005, and No. 11-205754 disclose image processing techniques performed on video signals, such as special effects. Video signals captured by digital cameras or the like has a value represented in the YUV color space, a uniform color space. When mapping an image corresponding to a video signal to computer graphics as a texture and then performing predetermined processing, a color space conversion (CSC) has to be performed beforehand. More specifically, to apply special effects to the video signals, the color space of the video signals is converted into the RGB color space, used in computer graphics, from the YUV color space, before performing the predetermined processing such as texture mapping.

SUMMARY OF THE INVENTION

However, ranges of color represented in a YUV color space and an RGB color space differ. Thus, when processing video signals in the RGB color space converted from the YUV color space, and converting the YUV color space back to the RGB color space, multiple conversion errors may accumulate. This not only makes it difficult to retain the color of the original image after performing the color space conversion (CSC) but also takes processing time for the CSC.

Embodiments of the present invention are made to address these problems. More specifically, according to an embodiment of the present invention, an image processing apparatus includes a video signal input section for receiving a video signal having a value represented in a first color space, a signal converting section for performing predetermined conversion processing on a signal having a value represented in a second color space that is different from the first color space, and a signal interface section for supplying the signal converting section with the video signal, received by the video signal input section, having a value represented in the first color space as a substitute for the signal having a value represented in the second color space.

In this embodiment, when performing the predetermined processing on the video signal, the video signal having the value represented in the first color space is supplied to the signal converting section as a substitute for the signal having the value represented in the second color space, and the processing is performed on the video signal. This advantageously prevents the occurrence of color alteration due to the CSC from the first color space to the second color space and eliminates processing time necessary for the CSC.

According to another embodiment of the present invention, an image processing process includes the steps of receiving a video signal having a value represented in a first color space, and performing predetermined conversion processing on a signal having a value represented in a second color space that is different from the first color space, wherein the predetermined conversion processing is performed on the received video signal having a value represented in the first color space as a substitute for the signal having a value represented in the second color space.

In this embodiment, software enables a computer to perform the predetermined conversion processing on the video signal having the value represented in the first color space as a substitute for the signal having a value represented in the second color space. This advantageously prevents the occurrence of color alteration due to the CSC from the first color space to the second color space and eliminates the processing time necessary for the CSC.

According to a further embodiment of the present invention, a computer readable recording medium has a program recorded thereon that enables a computer to execute a process including the steps of receiving a video signal having a value represented in a first color space, and performing predetermined conversion processing on a signal having a value represented in a second color space that is different from the first color space, wherein the predetermined conversion processing is performed on the received video signal having a value represented in the first color space as a substitute for the signal having a value represented in the second color space.

In this embodiment, it is possible to distribute recording media having a program recorded thereon that enables the above-described image processing process to be executed on a computer.

As the first color space representing the value of a video signal, uniform color spaces such as YUV and L*a*b* are utilized. As the second color space, color spaces employed in video displaying apparatuses (monitors, etc.), such as the RGB color space, are utilized. The signal converting section may perform not only coordinate conversion processing, such as translation, rotation, and deformation, but also shading processing using coefficients corresponding to the first color space.

According to the embodiments of the present invention, the signal processing is, thus, performed using the color space of the video signals of a texture. This advantageously eliminates processing time necessary for the CSC and allows the predetermined conversion processing to be performed keeping the color of the original image.

DESCRIPTION OF THE PREFERRED EMBODIMENTS

Embodiments of the present invention will be described below with reference to the accompanying drawings. An image processing apparatus according to an embodiment of the present invention employs texture mapping techniques in computer graphics, when applying special effects to video signals. The image processing apparatus is capable of implementing special effect processing at high speed without alternating color by eliminating color space conversion (CSC) between video signals and computer graphics signals.

Figure 1:
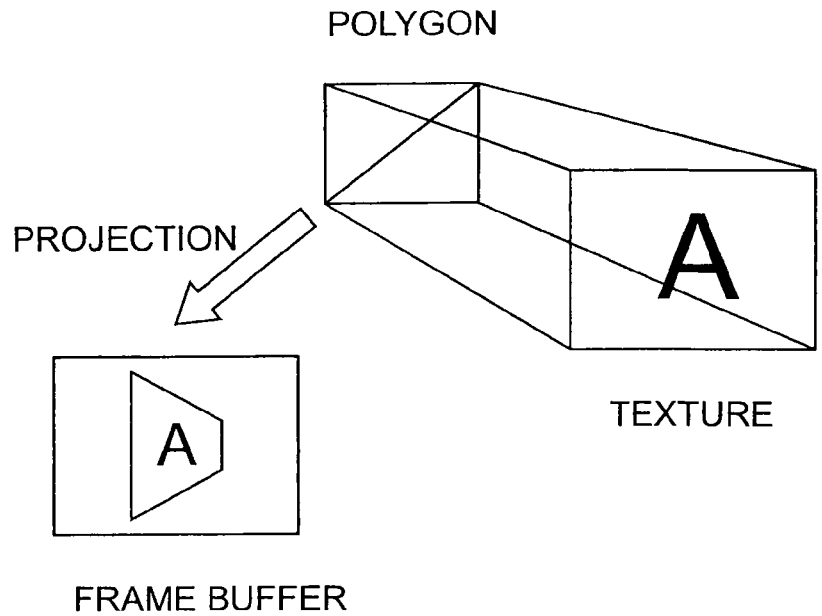
FIG. 1 is a schematic diagram illustrating video conversion processing with texture mapping.

Referring to a schematic diagram shown in FIG. 1, video conversion processing with texture mapping will be described. In computer graphics, when processing a video signal, an image corresponding to the video signal is mapped onto a polygon as a texture. After performing predetermined conversion processing, such as translation and rotation, on the polygon, the polygon is rendered into a frame buffer. Use of a special purpose hardware device increases the speed of the above-described processing.

Using an RGBA data format that has components of R (red), G (green), B (blue), and A (transparency) for each pixel, the processing is typically performed on the texture as well as the image in the frame buffer. Accordingly, in the related art, a YUV-to-RGB CSC is first performed on the video signal in a YUV data format that has components of Y (luminance), U (chrominance for blue), and V (chrominance for red), and then the rendering is performed. After the rendering, the color space of the rendering result is converted back to the YUV color space.

Figure 2A:
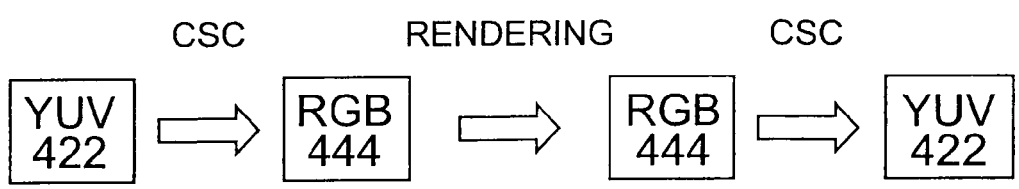
FIG. 2A is a schematic diagram illustrating a process concerning color space conversion according to the related art.
Figure 2B:
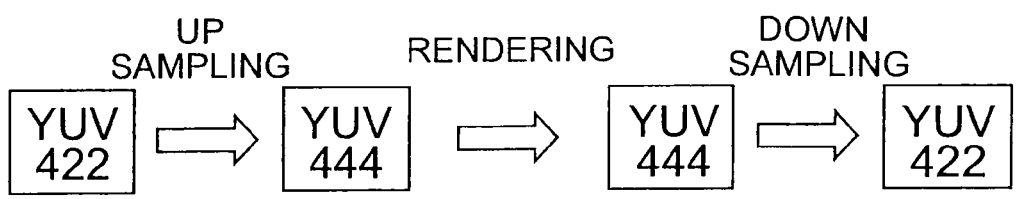
FIG. 2B is a schematic diagram illustrating a process according to an embodiment of the present invention.

FIG. 2A is a schematic diagram illustrating a process concerning the CSC according to the related art. FIG. 2B is a schematic diagram illustrating a process according to an embodiment of the present invention. As shown in FIG. 2A, in the related art, the CSC is performed to convert a video signal in a YUV422 data format (YUV422 signal), for example, to a video signal in an RGB444 data format (RBG444 signal). In the YUV422 data format, four "Y" components, two "U", components, and two "V" components are sampled from every four pixels. In the RGB444 data format, components of "R", "G", and "B" are sampled from each pixel of every four pixels. The predetermined rendering is performed using the RGB444 signal, and then the CSC is performed to convert the RGB444 signal back to the YUV422 signal. Since the CSC is performed at least twice, color space conversion errors undesirably accumulate.

On the other hand, the embodiment of the present invention permits the video signals to be processed without converting the color space from YUV to RGB, which thus eliminates the CSC. More specifically, as shown in FIG. 2B, a YUV422 video signal, for example, is first up-sampled to a YUV444 signal instead of performing the CSC. The predetermined rendering is performed using the YUV444 signal, and then the YUV444 signal is down-sampled to the YUV422 signal. Up-sampling and down-sampling operations are performed before and after the rendering, respectively, since the video signals are typically represented using the YUV422 data format. This advantageously eliminates processing time necessary for the CSC and prevents the occurrence of the color alteration due to the CSC.

Figure 3:
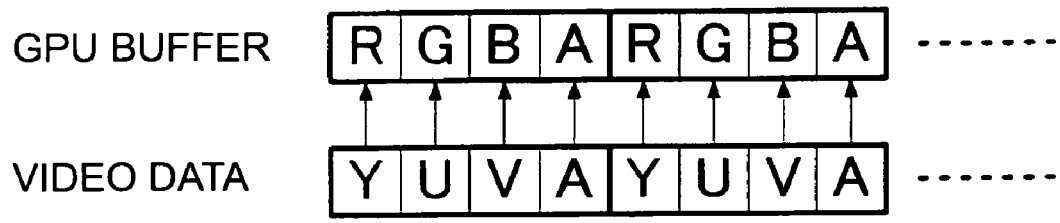
FIG. 3 is a schematic diagram illustrating the association between areas in a buffer and components of video data.

A GPU (Graphics Processing Unit) typically includes a buffer (GPU buffer) therein that has areas each corresponding to one of the "R", "G", "B", and "A" components of pixel data. Each "Y", "U", "V", and "A" component of the video data is directly associated with the corresponding area in the GPU buffer. FIG. 3 is a schematic diagram illustrating the association between the areas in the GPU buffer and the components of the video data. In this example, values of the "Y", "U", "V", and "A" components are directly supplied to the "R", "G", "B", and "A" areas in the GPU buffer, respectively. The areas of the buffer may be associated with any component.

As described above, each component of the YUV video data is directly supplied to the associated buffer area, originally provided for the corresponding RGB component, and is processed as RGB data. This advantageously eliminates the necessity of the CSC, therefore eliminating processing time necessary for the CSC and preventing the occurrence of the color alteration due to the CSC.

Figure 4:
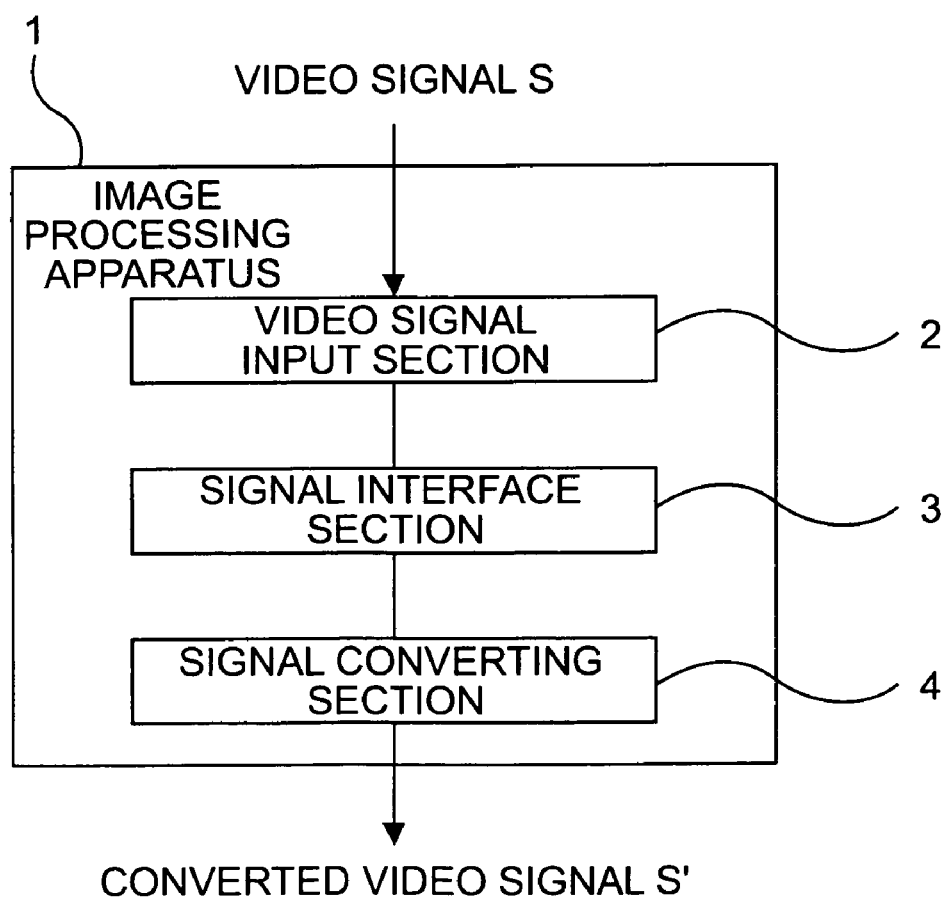
FIG. 4 is a block diagram illustrating an exemplary configuration of an image processing apparatus according to an embodiment of the present invention.

FIG. 4 is a block diagram illustrating an exemplary configuration of an image processing apparatus according to an embodiment of the present invention. More specifically, an image processing apparatus 1 according to the embodiment includes a video signal input section 2, a signal interface section 3, and a signal converting section 4. The video signal input section 2 receives a video signal S having a value represented in a first color space, such as a YUV color space. The video signal converting section 4 performs predetermined conversion processing on a signal having a value represented in a second color space, such as an RGB color space, that is different from the first color space. The signal interface section 3 supplies the signal converting section 4 with the video signal S, received by the video signal input section 2, that has a value represented in the first color space as a substitute for the signal having a value represented in the second color space.

Hardware or software may be used to implement all of the configurations described above. Alternatively, hardware may be used to implement part of a configuration, and software may be used to implement the rest of the configuration. The part implemented by software is executed by a CPU of a computer, and may be distributed via recording media, such as CD-ROM disks, having the software recorded thereon, or through a predetermined network.

The video signal S has a value represented in a uniform color space (for example, YUV and L*a*b*) that is employed in video apparatuses, such as digital cameras. The YUV color space is applied to this embodiment, however, the other color spaces are also applicable. The video signal input section 2 receives the video signal S in the YUV data format, and supplies the video signal S to the signal interface section 3.

Without performing the CSC, the signal interface section 3 supplies the video signal S in the YUV data format to the signal converting section 4 so that the components of the YUV color space and the components of the color space utilized in the signal converting section 4 have a one-to-one correspondence. In other words, the signal interface section 3 supplies each component of the YUV video signal S to the associated area of the GPU buffer used by the signal converting section 4. For example, when RGB color space is employed in the signal converting section 4, each component of the YUV video signal is supplied to the associated buffer area, originally provided for the corresponding RGB component, so that the YUV components and the RGB components have a one-to-one correspondence.

The areas of the buffer may be associated with any component. For example, as shown in FIG. 3, the "Y", "U", and "V" components of the video data are supplied to the "R", "G", and "B" areas in the GPU buffer, respectively. Also, the "A" component of the video data may be supplied to the "A" area in the GPU buffer, if necessary.

The signal converting section 4 performs predetermined conversion processing on the video signal S supplied from the signal interface section 3. More specifically, the signal converting section 4 performs the predetermined conversion processing on the YUV data of the video signal S assuming the YUV data as the RGB data. The conversion processing includes various coordinate conversions, such as translation, rotation, and deformation. Such coordinate conversions are performed only on coordinates but not on the color data. Accordingly, performing a calculation on the YUV data assuming the YUV data as the RGB data does not cause any problem.

The signal converting section 4 outputs a converted video signal S' after performing the predetermined conversion processing, such as the coordinate conversions, using the YUV data held in the GPU buffer. The above-described procedure permits the predetermined conversion processing, such as the coordinate conversions, to be performed without the CSC. Also, the signal converting section 4 may perform the predetermined conversion processing on color components using RGB data (including the data converted from the YUV data).

Shading processing that is performed on the video signal using the image processing apparatus and the image processing program according to the embodiment will be now described. Since the GPU processes the video signal in RGB color space, it is difficult to obtain a desired result, when performing processing concerning color correction, such as shading, on the YUV data assuming the YUV data as the RGB data. Thus, the following shading algorithm is employed in this embodiment.

Generally, a rendering equation employed in the shading algorithm is expressed as follows:

$$I = La \times ka \times C + \sum_{i=0}^{n-1} \{Ld(i) \times kd \times \cos\theta_d \times C + Ls(i) \times ks \times \cos^{kn}\theta_s\} \quad (1)$$

$ka$: ambient reflection coefficient  $kd$: diffuse *reflection* coefficient $ks$: specular reflection coefficient  $kn$: highlight coefficient $La$: ambient light intensity  $Ld$: diffuse light intensity $Ls$: specular light intensity  $C$: texture color $\Theta d$: angle between incident light ray and surface normal of object $\Theta s$: angle between regular reflection direction and view direction With respect to "C", equation (1) is rearranged into equation (2).

$$I = \left(La \times ka + \sum_{i=0}^{n-1}\{Ld(i) \times kd \times \cos\theta_d\}\right) \times C + \sum_{i=0}^{n-1}\{Ls(i) \times ks \times \cos^{kn}\theta_s\} \quad (2)$$
$$= K_0 \times C + K_1$$

Since the calculation of equation (2) is performed on each RGB component, equation (2) can be expressed as equation (3).

$$\begin{pmatrix} I_R \\ I_G \\ I_B \end{pmatrix} = \begin{pmatrix} K_{0R} & 0 & 0 \\ 0 & K_{0G} & 0 \\ 0 & 0 & K_{0B} \end{pmatrix} \begin{pmatrix} C_R \\ C_G \\ C_B \end{pmatrix} + \begin{pmatrix} K_{1R} \\ K_{1G} \\ K_{1B} \end{pmatrix} \quad (3)$$

Now, using an RGB-to-YUV CSC matrix Tr and a normalized YUV matrix, equation (4) can be obtained, where the range of each component of RGB and YUV is [0.0, 1.0].

$$\begin{pmatrix} R \\ G \\ B \end{pmatrix} = Tr^{-1} \begin{pmatrix} Y \\ U - 0.5 \\ V - 0.5 \end{pmatrix} \quad (4)$$

When applying equation (4) to "I" and "C" of equation (3), equation (5) can be obtained.

$$\begin{pmatrix} I_Y \\ I_U \\ I_V \end{pmatrix} = Tr \begin{pmatrix} K_{0R} & 0 & 0 \\ 0 & K_{0G} & 0 \\ 0 & 0 & K_{0B} \end{pmatrix} Tr^{-1} \begin{pmatrix} C_Y \\ C_U - 0.5 \\ C_V - 0.5 \end{pmatrix} + Tr \begin{pmatrix} K_{1R} \\ K_{1G} \\ K_{1B} \end{pmatrix} + \begin{pmatrix} 0 \\ 0.5 \\ 0.5 \end{pmatrix} \quad (5)$$

Therefore, performing the calculation with equation (5) allows the shading to be performed on the YUV texture and the YUV data to be output. The CSC matrix Tr corresponding to the video signal format may be used.

Luminance values for the individual RGB components are often identical. In such a case, equation (3) can be expressed as equation (6), which permits the shading processing to be performed on the YUV texture in the same manner as that performed on an RGB texture without using the CSC matrix.

$$\begin{pmatrix} I_Y \\ I_U \\ I_V \end{pmatrix} = \begin{pmatrix} K_{0Y} & 0 & 0 \\ 0 & K_{0Y} & 0 \\ 0 & 0 & K_{0Y} \end{pmatrix} \begin{pmatrix} C_Y \\ C_U - 0.5 \\ C_V - 0.5 \end{pmatrix} + \begin{pmatrix} K_{1Y} \\ 0.5 \\ 0.5 \end{pmatrix} \quad (6)$$

Image processing apparatuses and image processing processes according the embodiments of the present invention associate the YUV components and the RGB components with a one-to-one correspondence to process the texture, when applying 3D special image effects in computer graphics to the video signals. This advantageously eliminates the CSC, therefore preventing the image quality degradation due to the CSC. Elimination of the CSC not only retains the same image quality as that of input images but also increases the processing speed.

Typically, calculation for shading is performed in RGB color space. However, providing the coefficients necessary for the calculation, which correspond to the YUV color space, permits the shading to be performed without performing CSC.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus comprising:
a video signal input section configured to receive a YUV 422 video signal having a plurality of first components which are members of a YUV color space, the first components of the YUV 422 video signal inputted into a GPU buffer originally provided for a signal with a plurality of corresponding second components which are members of an RGB color space, wherein areas of the GPU buffer may be associated with any YUV component, such that values of the Y, U, and V components are directly supplied to R, G, and B areas in the GPU buffer, respectively;
a signal interface section configured to upsample the YUV 422 video signal to a YUV 444 video signal and to supply a signal converting section with the YUV 444 video signal as a substitute for the signal having a value represented in the RGB color space; and
the signal converting section configured to perform predetermined conversion processing on the YUV 444 video signal and the predetermined conversion processing is performed on the YUV 444 video signal without a color space conversion, and after the signal converting section performs the predetermined conversion processing on the YUV 444 video signal, the YUV 444 video signal is downsampled to a YUV 422 video signal.

2. The image processing apparatus according to claim 1, wherein the signal converting section performs coordinate conversion processing.

3. The image processing apparatus according to claim 1, wherein the signal converting section performs shading processing using coefficients corresponding to the YUV color space.

4. The image processing apparatus according to claim 1, wherein the predetermined conversion processing maps the plurality of first components to the plurality of second components via a one-to-one correspondence.

5. The image processing apparatus according to claim 1, wherein the signal interface section supplies the video signal in the YUV color space to the signal converting section so that the first components and the second components utilized in the signal converting section have a one-to-one correspondence.

6. An image processing process, comprising:
receiving a YUV 422 video signal having a plurality of first components which are members of a YUV color space, the first components of the YUV 422 video signal inputted into a GPU buffer originally provided for a signal with a plurality of corresponding second components which are members of an RGB color space, wherein areas of the GPU buffer may be associated with any YUV component, such that values of the Y, U, and V components are directly supplied to R, G, and B areas in the GPU buffer, respectively;
upsampling the YUV 422 video signal to a YUV 444 video signal;
supplying a signal converting section with the YUV 444 video signal as a substitute for the signal having a value represented in the RGB color space; and
performing predetermined conversion processing on the YUV 444 video signal and the predetermined conversion processing is performed on the YUV 444 video signal without a color space conversion, and after the signal converting section performs the predetermined conversion processing on the YUV 444 video signal, the YUV 444 video signal is downsampled to a YUV 422 video signal.

7. The image processing process according to claim 6, wherein the performing the predetermined conversion processing includes performing coordinate conversion processing.

8. The image processing process according to claim 6, wherein the performing the predetermined conversion processing includes performing shading processing using coefficients corresponding to the YUV color space.

9. A nontransitory computer readable recording medium having a program recorded thereon that enables a computer to execute a process, the process comprising:
receiving a YUV 422 video signal having a plurality of first components which are members of a YUV color space, the first components of the YUV 422 video signal inputted into a GPU buffer originally provided for a signal with a plurality of corresponding second components which are members of an RGB color space, wherein areas of the GPU buffer may be associated with any YUV component, such that values of the Y, U, and V components are directly supplied to R, G, and B areas in the GPU buffer, respectively;
upsampling the YUV 422 video signal to a YUV 444 video signal;
supplying a signal converting section with the YUV 444 video signal as a substitute for the signal having a value represented in the RGB color space; and
performing predetermined conversion processing on the YUV 444 video signal and the predetermined conversion processing is performed on the YUV 444 video signal without a color space conversion, and after the signal converting section performs the predetermined conversion processing on the YUV 444 video signal, the YUV 444 video signal is downsampled to a YUV 422 video signal.

* * * * *